J. A. D. HERRINGTON.
TESTING APPARATUS.
APPLICATION FILED JUNE 1, 1917.
1,350,368.
Patented Aug. 24, 1920.
2 SHEETS—SHEET 1.
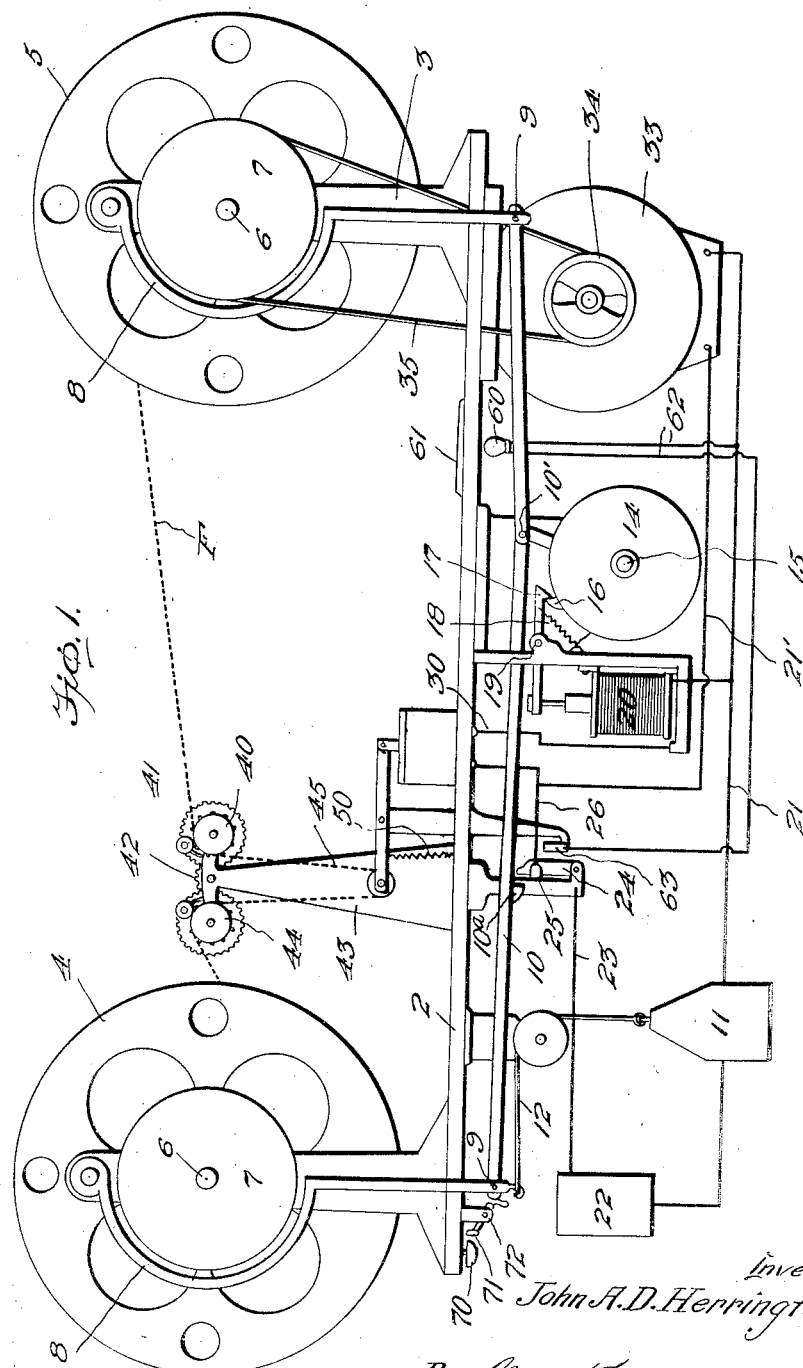
Inventor
John A. D. Herrington
By Mason Fenwick and Lawrence
Attys J. A. D. HERRINGTON.
TESTING APPARATUS.
APPLICATION FILED JUNE 1, 1917.
1,350,368.
Patented Aug. 24, 1920.
2 SHEETS—SHEET 2.
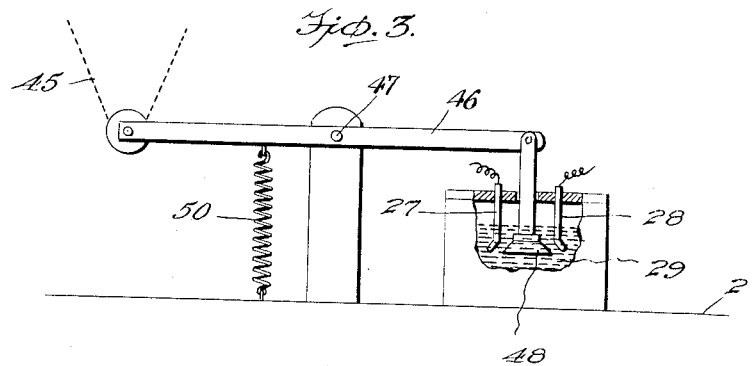
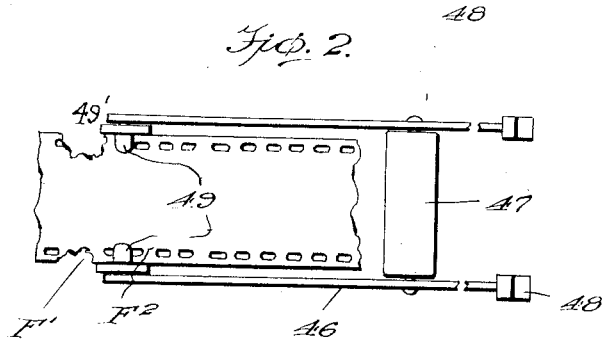
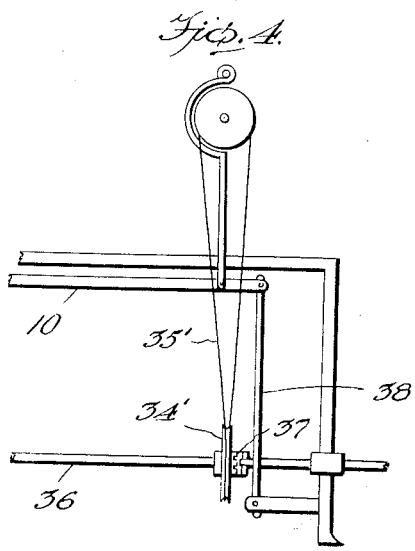
Inventor
John A. D. Herrington
By Mason Fenwick and Lawrence
Att'ys.

UNITED STATES PATENT OFFICE.

JOHN A. D. HERRINGTON, OF TUPELO, MISSISSIPPI, ASSIGNOR OF ONE-FOURTH TO ELIE B. HULSEY, OF EARL, ARKANSAS, ONE-FOURTH TO WILEY A. BLAIR AND ONE-FOURTH TO GEORGE H. HILL, BOTH OF TUPELO, MISSISSIPPI.

TESTING APPARATUS.

1,350,368.     Specification of Letters Patent.     Patented Aug. 24, 1920.

Application filed June 1, 1917. Serial No. 172,315.

*To all whom it may concern:*

Be it known that I, JOHN A. D. HERRINGTON, a citizen of the United States, residing at Tupelo, in the county of Lee and State of Mississippi, have invented certain new and useful Improvements in Testing Apparatus; and I do hereby declare the following to be a full, clear, and exact description of the invention, such as will enable others skilled in the art to which it appertains to make and use the same.

This invention relates to testing apparatus, and particularly to an apparatus for detecting marginal fractures in webs, strips or films.

My present invention relates to the art of motion picture apparatus, and particularly to the mechanical inspection of motion picture films, and has for its object to eliminate manual labor and to save time in this practice. At present motion picture films are examined by an operator for the purpose of finding fractures in the marginal edges and adjacent the sprocket holes of the film so that during the winding or rewinding of the film from one reel to another the damage in the film can be located and if necessary can be remedied before the reel is again run through a machine. The operator or inspector makes this inspection by holding a ribbon or film between two fingers of one hand and drawing the ribbon along so that the marginal portion passes between the fingers, and fractures or lacerations are thus detected and repaired. This not only requires a considerable amount of time and keeps one operator continuously busy at this work, but is also expensive and not entirely satisfactory.

It is one of the objects of the present invention to provide a machine which mechanically detects fractures or lacerations in the film margins and thus eliminates manual labor in this respect and the invention consists of an apparatus of such type that a material saving is made in the time requisite for testing or inspecting a ribbon or film and thus leaves one operator free so that he may operate several of the machines at one time.

A further object of the present invention to provide an apparatus which will operate simultaneously on both edges or margins of a film and which is adapted to automatically interrupt the operation of the machine upon the detection of a fracture and cause visual and audible signals to be given of the interruption of the operation of the machine.

With the above and other objects in view there is illustrated in the accompanying drawing and described in the following specification embodiments of the invention in which drawing:

Figure 1 is a side elevation of the apparatus showing the electric wiring diagrammatically.

Fig. 2 is a detail plan view of the fracture detecting devices controlling the closure or interruption of the electric circuits.

Fig. 3 is a detail sectional view of the detecting mechanism illustrating the provision of a submerged circuit closing device.

Fig. 4 shows a modification of a portion of the apparatus in which the mechanism is adapted to be connected to or disconnected from a main shaft from which a plurality of the machines may be driven.

The present apparatus is capable of being mounted upon any suitable form of frame or supporting structure, and may involve in its organization a base or table structure 2 having at each end suitable uprights 3 for supporting reels 4 and 5 which may be mounted upon drum shafts 6 on the standards 3, these shafts being provided with brake drums 7 with which there are adapted to contact suitable brake devices 8, these being connected at 9 with a common brake rod or connection 10 which may be appropriately disposed and is shown here as arranged beneath the table or shelf 2. The brake is adapted to be automatically operated through any suitable impulse mechanism, a form of which is shown as comprising a weight 11 of suitable proportions which is connected by a suitable flexible device 12 to one of the levers of the brake or to any other suitable point in the brake linkage. To hold the brakes in open inactive position any suitable restraining device may be employed, and in this arrangement the brake link 10 is shown as connected at 10' to a lever or wheel 14 which may be turnably mounted on a stud 15 supported from a bracket depending from the shelf or table 2. The lever 14 is provided with a ratchet shoulder 16 adapted to be engaged by a latch or ratchet pawl 17 which may be constrained by a spring 18 into latching position with the surface of the drum or lever 14 which is connected to the brake link 10. The pawl 17 is shown as pivotally mounted at 19 and is connected at its opposite end with the core of a solenoid or other suitable electro-magnetic device 20 deriving electrical current through a circuit wire 21 leading to a battery 22 from which there is led a wire 23, this being connected to one end of a switch arm 24 which is adapted to close electrical circuit by engagement with a contact 25 from which leads a wire 26. This latter wire is connected to a contact plate 27 suitably spaced from another contact plate 28, these preferably being arranged in a bath 29 for the purpose of preventing sparking at the interruption of a circuit. From contact 28 a wire 30 extends to and connects with the solenoid 20 so that upon completion of the circuit, if the switch 24 is closed, by a circuit closer at the contacts 27 and 28, the solenoid will be energized and cause the instantaneous release by the pawl 17 of the brake controlling device 14 whereupon the brake setting action automatically occurs and rotation of the film reels 4 and 5 interrupted and stopped.

Any suitable form of driving mechanism may be utilized to run the winding reel 5, for instance, to unwind the film from the reel 4 and in Fig. 1 the winding operation is effected through means of a suitable electric motor as 33 which drives a belt pulley 34, which, through means of a belt 35, drives the belt wheel or drum 7 carrying the reel 5. A modification of this form of driving mechanism is shown in Fig. 4 in which the reel operating mechanism is shown as connected by the belt 35' to a pulley 34' which is secured on a common shaft 36 which may be of suitable length so as to be capable of connection to a multiplicity of the detecting mechanisms. In this modification of the invention the pulley 34' is adapted to be coupled to the driving shaft 36 by any suitable form of clutching device 37 which may be controlled by the operation of the brake link 10 so that when the brake is thrown to stop the operation of the winding mechanism the clutch 37 may be disengaged, through means of a clutch arm 38, from the wheel 34 and thereby prevent further operation of the driven film reel.

One of the important features of my present invention resides in the means for operating upon the film F as it runs from one reel 4 to to the winding reel 5, and which is provided for the purpose of detecting lacerations or fractures in the edges of the film such as disclosed at F' in Fig. 2. To provide for this mechanical detection or testing of the margins of the film the latter is caused to run over a pair of equalizing film sprockets 40 which are geared to run at uniform speed through means of respective sprocket wheels 41 which are intermediately geared to each other by an idler 42, these several gears being appropriately journaled upon an upright 43, here shown as projecting upwardly from the table or bench 2 of the apparatus to a suitable height, and upon the shafts of the sprockets 40 there may be provided sprocket or film drums 44 of suitable width over which the film is directed, as shown in Fig. 1, and thence downwardly centrally between these sprocket drums 44 to form a bight 45. At the lower end or bend of the bight there is arranged a device provided with independently operable arms or means engaging the marginal portions of the film F, these devices being of such type or character that upon presentation thereto of a lacerated or fractured portion in either edge of the film the devices will operate to close an electrical circuit at the contacts 27—28 above described, and thereby cause the energization of the solenoid 20 through means of which the brake mechanism may be released and allowed to set, thus interrupting the feeding of the film F. Any suitable type of detecting devices may be utilized to accomplish this purpose, and as shown in Fig. 2, these devices each includes an arm or lever 46 which is pivoted intermediate its ends on a suitable fulcrum 47, and each of which is provided at its opposite end with a circuit closing or contact member 48 arranged as shown in Fig. 3 in the bath of liquid which may, for instance, be oil, in the cup or receptacle in which the contacts 27 and 28 are mounted. The detecting arms 46 are shown in Fig. 2 as spaced laterally from each other upon opposite ends of the supporting fulcrum 47, and each carries at the end about which the bight 45 turns detecting points or fingers 49 which project inwardly a sufficient distance over the marginal portions of the film so as to substantially cover the sprocket holes $F^2$ in the latter, and then as a fracture or laceration in the film passes into alinement with either of the inwardly projecting detecting fingers 49 on the ends of the arms 46, either of these latter will be caused to pass through the bight of the film bias either by the force of gravity or any other suitable acting influence, such, for instance, as under the impulse of light springs 50, one of which is connected to each of the detecting levers 46. The fingers or detecting devices 49 are preferably rotatively mounted on the ends of the levers 46, and are also provided with flanges 49' which rotate freely along the edges of the moving film F, as this is drawn onto the winding reel 5. From this it will be seen that as a fractured marginal portion of the film F passes beneath the detecting fingers 49 of either of the arms 46, this then will automatically operate under the impulse of its spring 50, for instance, and cause the automatic closure by the contact 48 thereon engaging the fixed contact devices 27—28 which are arranged in the bath or receptacle 29 as above described.

For the purpose of automatically interrupting the operation of the winding reel 5 and also the movement of the unwinding reel 4, as soon as a fracture is detected by the detecting fingers 49 the brakes are released, as above described, and when the winding reel is driven through means of a motor as 33, Fig. 1, the operation of the latter will be interrupted through the breakage of a circuit thereto through its feed wire 21 and its return wire 21' by the opening of the switch 24 through the operation of the brake link 10, the latter being provided at a suitable portion with a plug 10ª so disposed as to engage with the blade 24 of the switch and throw this latter outwardly into circuit-breaking position, thus preventing the passage of current to the electric motor 33 and also interrupting the circuit through the solenoid 20.

Another feature of the invention consists in providing means for giving visual and audible signals to attract the attention of the operator to the interruption of the machine owing to the detection of a fracture or laceration in one of the margins of the film, and this is readily accomplished through means of an electric light 60 which is disposed below the table or shelf 2 of the apparatus which latter is provided with a window 61 above the light 60. This light is adapted to be energized through suitable circuit wires 62, one of which is connected to the feed wire 21 and the other of which is connected to a contact 63 disposed in juxtaposition to the switch 24 so that when the latter is automatically disengaged from the motor controlling engaging position by the operation of the switch lug 10ª, the light will be energized. This energizing of the light not only notifies the operator of the stoppage of the apparatus but also provides illumination for the ready repair of the film passing through the apparatus. To secure audible alarm to notify the operator of the interruption of the operation of the machine any suitable signal may be utilized, a simple form of which comprises a bell 70 which may be mounted conveniently upon the apparatus and is shown as sounded by a clapper 71 which is adapted to be actuated by a suitable connecting device 72, in this instance attached to the brake mechanism so that as the brakes are set the bell 70 will be sounded.

What I claim is:

1. In apparatus for testing the margins of strips, web or films, means for moving the strip, means for interrupting the movement, means for normally holding said interrupting means, and means including spaced levers having rollers engaging the margins of the strip for releasing, on the existence of a fracture in the strip, said interrupting means.

2. In apparatus for detecting fractures in the margins of strips, webs or films, means for advancing the strip, etc., a brake for said means, means engaging and adapted to pass through fractures in the strip for controlling said means and controlled by the strip, and signal means controlled by the operation of said strip engaging and operative upon interruption of the advancing means.

3. In apparatus for testing the margins of strips, etc., a feeding or winding mechanism and a brake therefor, a controlling device for the brake comprising automatic detector members independently operative and respectively engaging opposite margins of the strip, and adapted to pass through marginal lacerations therein, and signal means controlled by said device to give a signal concurrently with the release of the brake.

4. In apparatus for testing the margins of strips, webs or films, means for forming a bight in the length of the strip, etc., being tested, means for advancing the strip, and independent detectors engaging the margins of the loop-end of the bight adapted to pass through lacerated portions of the margins and controlling the last named means and thereby the advance of the strip.

5. The combination of a strip guide, detectors independently movable transversely of the path and of the thickness of the strip and so related to the guides as to press, respectively, upon separated longitudinal zones of the strip, and biased to penetrate breaks or abnormal openings in the strip as they register with either detector.

6. Means for moving a strip, means for interrupting the movement thereof, independently movable detectors arranged and biased to bear respectively on parallel zones of the strip, and to move transversely of its thickness, and means responsive to the movement of either detector due to the presence of a break or an abnormal opening in the strip for controlling the interrupting means.

7. A strip feeding mechanism and a stopping device therefor, two independent detectors respectively bearing upon opposite margins of the strip and biased to move transversely of its thickness, and means responsive to the movement of either detector due to the presence of a break or abnormal condition of the strip for operating the stop device.

8. A pair of separated guides between which a strip may be looped to form a bight, a movable detector biased to tension the bight and to penetrate any break or abnormal opening therein registering with the detector.

In testimony whereof I affix my signature.

JOHN A. D. HERRINGTON.